US012753833B2

(12) United States Patent
Mason

(10) Patent No.: US 12,753,833 B2
(45) Date of Patent: Oct. 6, 2026

(54) MULTI-FIT ENCAPSULATED OSCILLATION DAMPENER FOR AUTOMOTIVE AUTOMATIC TRANSMISSIONS

(71) Applicant: SUPERIOR TRANSMISSION PARTS, INC., Tallahassee, FL (US)

(72) Inventor: Dean Mason, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 0 days.

(21) Appl. No.: 19/298,914

(22) Filed: Aug. 13, 2025

(65) Prior Publication Data

US 2026/0049655 A1 Feb. 19, 2026

Related U.S. Application Data

(60) Provisional application No. 63/682,427, filed on Aug. 13, 2024, provisional application No. 63/694,596, filed on Sep. 13, 2024.

(51) Int. Cl.

| | |
|---|---|
| ***F16F 15/02*** | (2006.01) |
| ***F16F 9/32*** | (2006.01) |
| ***F16F 13/00*** | (2006.01) |
| ***F16H 61/00*** | (2006.01) |
| ***F16K 15/02*** | (2006.01) |

(52) U.S. Cl.
CPC ....... *F16H 61/0009* (2013.01); *F16F 9/3214* (2013.01); *F16F 13/00* (2013.01); *F16F 15/022* (2013.01); *F16K 15/026* (2013.01); *F16F 2230/0005* (2013.01)

(58) Field of Classification Search
CPC ................ F16H 61/0009; F16F 15/022; F16F 2230/0005; F16F 9/3214; F16F 13/00; F16K 15/026
See application file for complete search history.

(56) References Cited

U.S. PATENT DOCUMENTS

| | | | | |
|---|---|---|---|---|
| 4,657,043 | A * | 4/1987 | Ampferer | F01M 1/16 137/538 |
| 10,156,293 | B1 * | 12/2018 | Bennett | F16K 15/026 |
| 2010/0294972 | A1 * | 11/2010 | Park | F16K 15/026 251/337 |
| 2021/0317921 | A1 * | 10/2021 | Guarda | F16K 17/04 |
| 2023/0135948 | A1 * | 5/2023 | Stafford | F16H 61/0009 137/454.2 |

* cited by examiner

*Primary Examiner* — Kelsey E Cary
(74) *Attorney, Agent, or Firm* — DOWELL & DOWELL, P.C.

(57) ABSTRACT

A dampener assembly includes a capsule housing an internal piston and spring, the spring positioned within and between both the piston and capsule. The capsule is generally cylindrical with an opening at a first end to accept the piston into an inner cylindrical channel of the capsule. A vent is positioned along a second end of the capsule to release pressure as the piston moves back and forth along the inner channel in response to fluid pressure in a transmission and counteracting force from the spring. The capsule is installed in either a reamed or unreamed bore and acts as a new bore. The dampener assembly is sealed to the bore by one or more elastomeric rings.

13 Claims, 12 Drawing Sheets

MULTI-FIT ENCAPSULATED OSCILLATION DAMPENER FOR AUTOMOTIVE AUTOMATIC TRANSMISSIONS

FIELD OF THE INVENTION

This invention is drawn generally to automatic transmissions, more specifically to electronically controlled automatic transmissions that employ oscillation dampeners. This includes transmissions with the potential to use dampeners.

Hydramatic 8 speed automatic transmission, which is commonly referred to as the 8L90, or 8L(xx) series, where "xx" is replaced by the appropriate torque range of the specific engine with which it is paired. For example, the "8L50" series transmission is paired with a 3.6L V6 engine and the "8L90" series transmission is paired in a pickup truck with a 5.3L V8 engine. Component parts and correction process described in this disclosure are designed specifically for the 8L(xx) series transmission or any other transmission that shares a similar structure. For simplicity, the 8L(xx) family of transmissions is hereafter referred to as "8L."

Even more particularly, the invention relates to a single encapsulated oscillation dampener assembly that can be fitted into two different size bores.

BACKGROUND OF THE INVENTION

Current transmission design incorporates electronic devices, such as switches, solenoids, sensors, and the like. Electronic rotation sensors provide RPM, or speed value inputs to the transmission control module (computer). In turn, the control module operates or activates solenoids as the primary "gear shift" control device to switch shift valves. The computer generates a pulsed width modulated (PWM) signal to drive the solenoids, which consequently generates an oscillating hydraulic output. Original design therefore included oscillation dampening devices to "quiet" or stabilize solenoid output pressure.

For example, the Ford 6F35 transmission includes first generation valve bodies that have the dampener pockets formed in the casting, but were unfinished and "blind", with no hydraulic connection to the dampener location. In the second and subsequent generations, the manufacture process was completed; the bores were finish reamed, dampeners added, and feed holes opened in the spacer plate. It is therefore possible to upgrade a first generation valve body design to the second generation valve body design by finishing the partial process.

Previous generations of automatic transmissions employed a centrifugally operated "governor" assembly, typically mounted on the transmission output shaft. This governor assembly generated a road speed signal; a progressively increasing output pressure (generally in linear fashion). The faster the vehicle travels, or the faster the output shaft spins, the higher the pressure. This "governor pressure" was used to time the shifts (gear changes). This governor pressure was integrated with a throttle pressure calibrated to gas pedal movement. In this manner shift timing was modulated to delay shifts during more rapid acceleration.

BRIEF SUMMARY OF THE INVENTION

An objective of the present invention is to teach a dampener assembly, comprising a capsule housing an internal piston and spring, the spring positioned within and between both the piston and capsule.

The dampener assembly may further include the piston having a flattened dome shape along a bottom surface.

The dampener assembly may further include two elastomeric rings of different cross-sectional sizes, the two elastomeric rings configured to be installed in a groove along an outer surface of the capsule.

A further embodiment of the dampener assembly is taught, wherein the two elastomeric rings are installed in the groove such that a fluid-tight seal is formed between the two elastomeric rings and a dampener bore when the dampener assembly is installed within the dampener bore.

The dampener bore may have a diameter of 10.033 mm or may have a diameter of 10.9728 mm.

A further embodiment of the dampener assembly is taught, wherein the capsule includes an opening along a first end for inserting the piston into an inner channel of the capsule.

A further embodiment of the dampener assembly is taught, wherein the capsule includes a vent along a second end.

A further embodiment of the dampener assembly is taught, wherein the piston has a rounded dome shape along a bottom surface.

A further embodiment of the dampener assembly is taught, wherein the piston has a stepped shape along a bottom surface.

Another objective of the present invention is to teach a method of repairing transmission dampeners with reamed or un-reamed bores, comprising removing an OEM dampener assembly from the dampener bore; and installing the dampener assembly of the present invention in the dampener bore such that the sleeve of the dampener assembly is fluidly sealed to the dampener bore by at least one elastomeric ring.

Alternatively, the dampener assembly may be fluidly sealed between the sleeve and the bore without use of a specific seal.

BRIEF DESCRIPTION OF THE SEVERAL VIEWS OF THE DRAWINGS

The invention will be better understood with reference to the following drawings.

DESCRIPTION OF THE INVENTION

Figure 1:
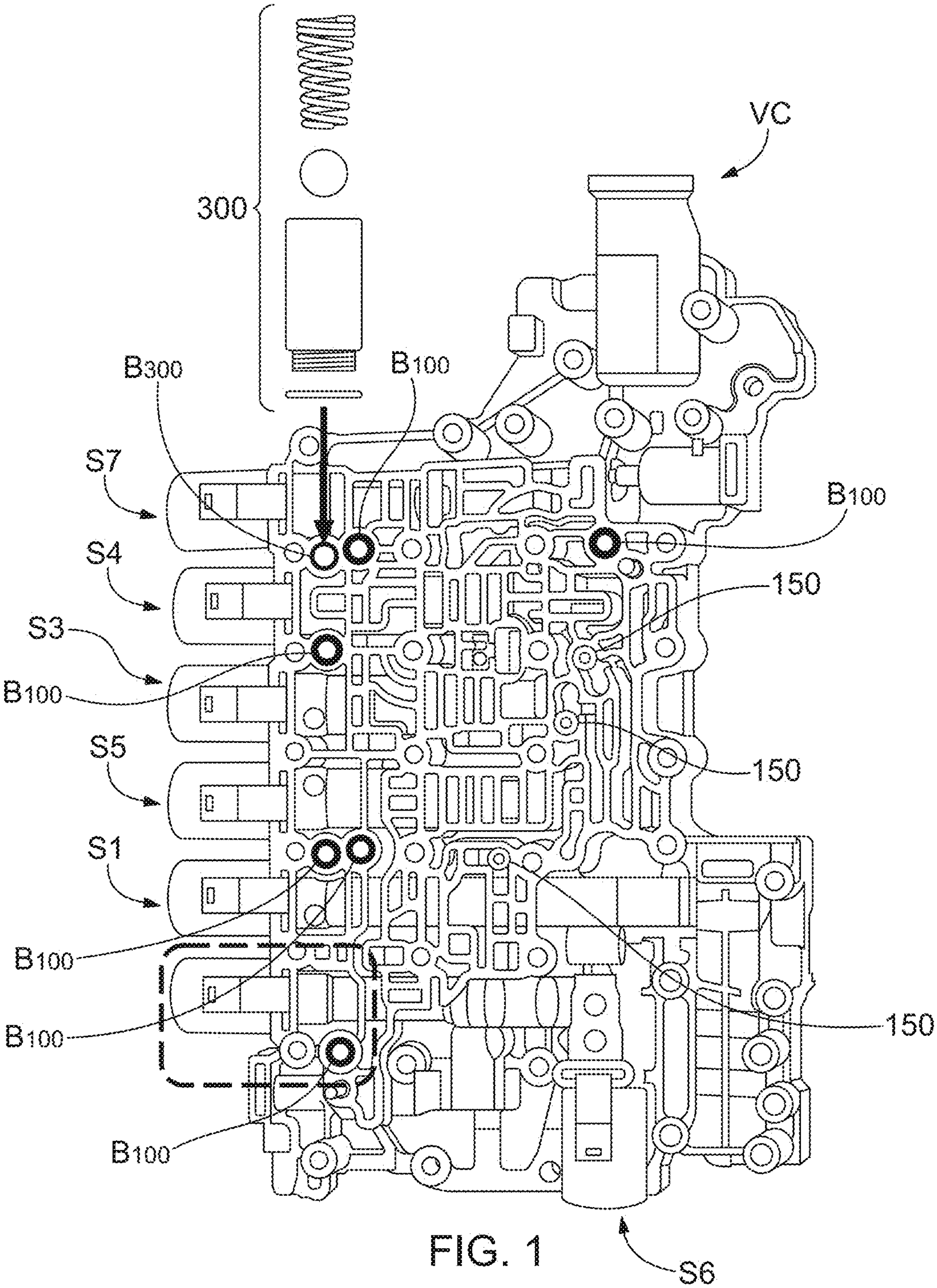
FIG. 1 shows a transmission valve body casting with dampener locations and ball installation positions, the transmission valve body casting represented by an 8L(xx) series transmission.
Figure 3:
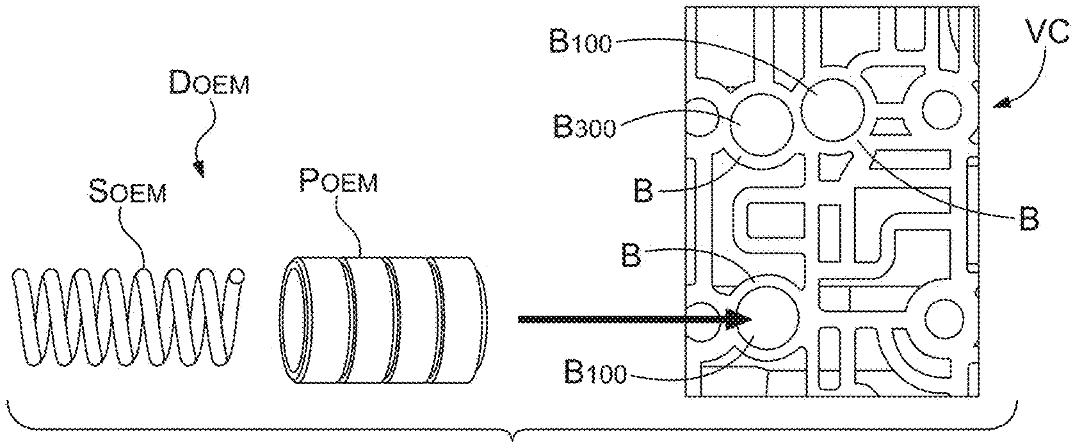
FIG. 3 shows an OEM dampener including a spring and sleeve, and insertion location with pocket enlargement on the valve body casting.

Original dampener design $D_{OEM}$ and manufacture is elementary, as shown in FIG. 3. The OEM dampener $D_{OEM}$ includes a spring $S_{OEM}$ and piston $P_{OEM}$. Dampener pockets D are bored into the valve body casting, into which is inserted the dampener piston $P_{OEM}$ and then spring $S_{OEM}$ as represented by the arrow from the piston $P_{OEM}$ into the dampener pocket B, specifically pocket $B_{100}$. These dampeners $D_{OEM}$ are inserted into at least each of the dampener pockets or bores B, including $B_{100}$ and $B_{300}$, as shown in FIG. 1 in a valve body casting VC of a representative transmission. Solenoids S1, S3, S4, S5, S6, and S7 are also shown in relation to the pocket B locations.

Figure 2:
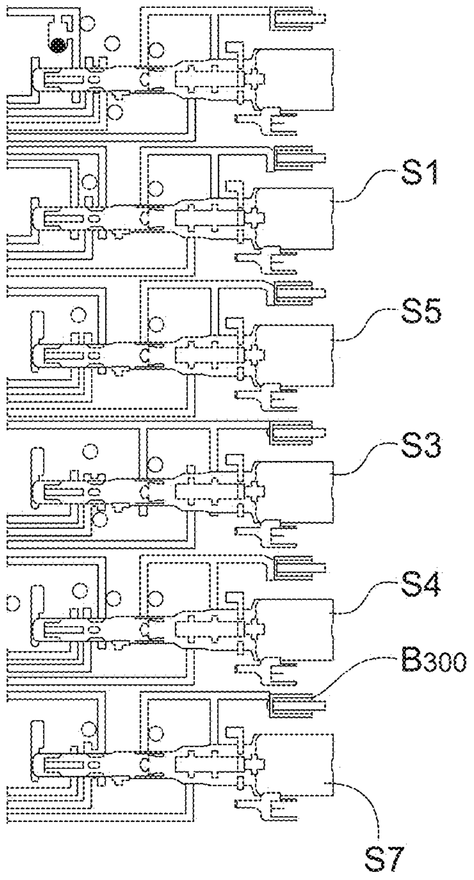
FIG. 2 shows a partial hydraulic circuit of solenoids and related dampeners provided in FIG. 1.

FIG. 1 includes circles highlighting pocket $B_{100}$ and $B_{300}$ locations for dampener assembly 100 and 300 installation. FIG. 2 provides a partial hydraulic schematic showing locations of the Solenoids S1, S3, S4, S5, and S7 and views of dampener pocket B locations.

Dampener $D_{OEM}$ operational activity and the resulting bore wear varies with each dampener location B. Dampeners related to lower gears (1st, 2nd, 3rd, etc.) are generally much more active than those for the higher gears. When cruising down the highway in top gear, all dampeners are inactive. During in town, stop and go driving, the lower gear dampeners are continually working during every up and down shift.

Wear increases with use and activity, so the dampener piston $P_{OEM}$ and bore B wear varies in degree or severity. In the remanufacture process, one method of dealing with disproportionate wear is to ream every dampener bore to a uniform size and install oversized dampener pistons. The result is two common bore sizes: a standard or un-reamed size of 10.033 millimeters (mm), or 0.395 inches ("), and an oversized or reamed size of 10.9728 mm (0.432"). Once the oversized pistons inserted into a reamed bore wear down, further reaming is inadvisable as it structurally weakens the valve body casting VC. From a hydraulic engineering perspective, the increased diameter and area of applied force becomes unresolvable. The required spring tension moves out of range, exceeding safe wire stress limits.

The present invention resolves this problem by providing a single encapsulated oscillation dampener assembly that can be fitted into two different size bores of varying wear while providing improved functionality.

The original equipment manufacturer components of the dampener $D_{OEM}$, including a piston $P_{OEM}$ and spring $S_{OEM}$, as configured to the 8L(xx) transmission, are shown in FIG. 3.

Figure 4:
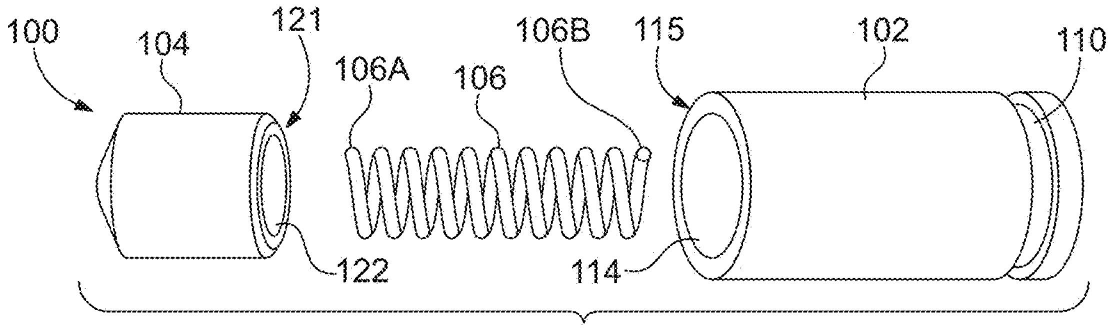
FIG. 4 shows an exploded perspective view of components of a dampener assembly according to an embodiment of the present invention.

Since both sizes of worn valve body casting bores B, which is damaged aluminum, are unusable, an encapsulated dampener assembly 100 is implemented, as shown in FIGS. 4 and 5. The sleeve 102, or capsule, houses the other components being a spring 106 and piston 104, and provides a new heat-treated steel internal bore with high grade surface finish in which the new machined steel piston 104 operates. This instantly extends dampener lifespan.

The sleeve 102 can be fitted to both bore sizes, including reamed and un-reamed bores. It can be sized for a relatively close fit to the smaller un-reamed bore, but the wear factor still precludes a precision (sealing) fit. Since the piston operates inside the capsule, the outside, or outer surface of the sleeve 102 must be sealed to maintain hydraulic integrity and functionality.

A single size dampener assembly can be fitted to both size bores, reamed and un-reamed, using two different size elastomeric seals 108, or O-rings. Hydraulically, the ring functions as a seal, preventing pressure loss. Mechanically, it supports the sleeve 102 in its installed position, providing additional stability.

In the case of the 8L transmission, only one O-ring 108 of each size is required for either size bore. Therefore, in a kit for where the sleeve 102 has only one circumferential groove 110, two O-rings 108 total would be supplied, one sized for a reamed bore and one sized for an un-reamed bore. If the difference in bore diameters is greater, the sleeve 102 could be designed to hold more O-rings 108 corresponding to additional circumferential grooves 110. For example, an O-ring 108 and corresponding groove 110 at the top of the sleeve 102 and one at the bottom of the sleeve. In that scenario, four O-rings 108, two of each size, could be provided for added sealing integrity.

Figure 5A:
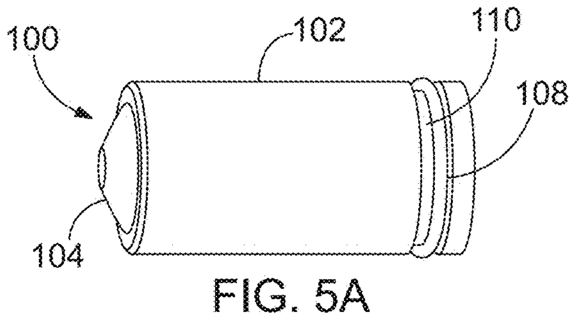
FIG. 5A shows a front perspective view of the assembled dampener assembly of FIG. 4.
Figure 5B:
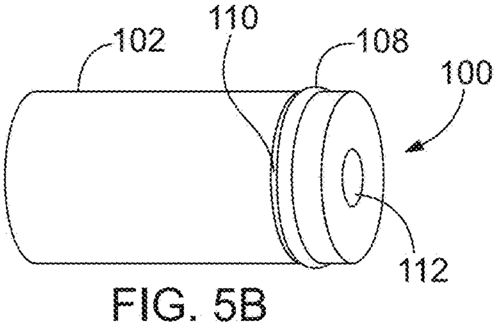
FIG. 5B shows a back perspective view of the assembled dampener assembly of FIG. 5A.

FIGS. 5A and 5B shows an embodiment of the encapsulated dampener assembly 100 with the piston 104 inserted into an inner chamber 116 via opening 114. The spring 106 is inserted at an end 106A into an inner chamber 121 of the piston 104 via an opening 122 of the piston, and an end 106B of the spring is inserted in the inner chamber 116 of the sleeve 102 via opening 114. A partial length of the spring 106 extends through a length of the chamber 121 of the piston 104, preferably an entire length of the chamber 121. A partial length of the spring 106 extends through a length of the chamber 116 of the sleeve 102, preferably a partial length of the chamber 116. The spring 106 is therefore configured to be compressible and expandable within the encapsulated dampener assembly 100 between the piston 104 and sleeve 102.

Figure 6A:
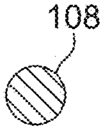
FIG. 6A shows a cross-sectional view of an elastomeric seal according to an embodiment of the invention.
Figure 6B:
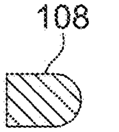
FIG. 6B shows a cross-sectional view of an elastomeric seal according to an alternate embodiment of the invention.
Figure 6C:
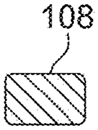
FIG. 6C shows a cross-sectional view of an elastomeric seal according to an alternate embodiment of the invention.
Figure 6D:
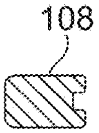
FIG. 6D shows a cross-sectional view of an elastomeric seal according to an alternate embodiment of the invention.

FIGS. 6A-6D show the four common cross-sectional shapes for elastomeric rings 108, assuming the ring was separated and straightened along a linear axis, that could be used in different embodiments of the dampener assembly 100 and other applicable inventions described herein. FIG. 6A is a typical O-ring shape. FIG. 6B shows a D-ring. FIG. 6C is a square-cut, or lathe cut, ring. FIG. 6D is a lathe cut double lip seal ring. The shapes of the rings 108 could be mixed and interchangeable in a kit. For example, one O-ring, as shown in FIG. 6A, and one D-ring, as shown in FIG. 6B could be used to provide seals for both reamed and un-reamed bores if the width of the groove 110 was limited such that a larger diameter O-ring would not be feasible.

In a preferred embodiment of the dampener assembly 100 kit, one ring 108 is sized to operate with the standard or un-reamed bore B size of 10.033 mm (0.395") and one ring is sized to operate with an oversized or reamed bore B size of 10.9728 mm (0.432"). The standard ring 108 is preferably sized at 1.0 mm (0.040"). The oversized ring 108 is preferably sized at 1.5 mm (0.058").

There is a wide variety of polymers developed with significant range of performance attributes that would be applicable for suitable elastomeric ring 108 performance. An 85+ durometer high grade fluorocarbon ring would be applicable for its high temperature rating, resistance to compression set, strong rebound, and good tensile strength. Although other materials are available, such high-grade fluorocarbon is highly preferred as an elastomeric ring material for its performance and durability, so by popular demand is available in any shape, diameter, or cross-section.

Alternately a Polytetrafluoroethylene (PTFE) style sealing ring, commonly used in rotating or reciprocating applications, could be used in a static application as well. Although mildly compressible and able to conform to bore irregularities, it's more prone to taking a set, and thus not desirable for long term use. Nevertheless, alternatively one O-ring 108 and one PTFE sealing ring 108 could be provided in a kit with each dampener assembly 100. Therefore, material, shape, and quantity are subjective variables determined in each application based on dimensional and/or operational restraints and requirements.

Figure 7A:
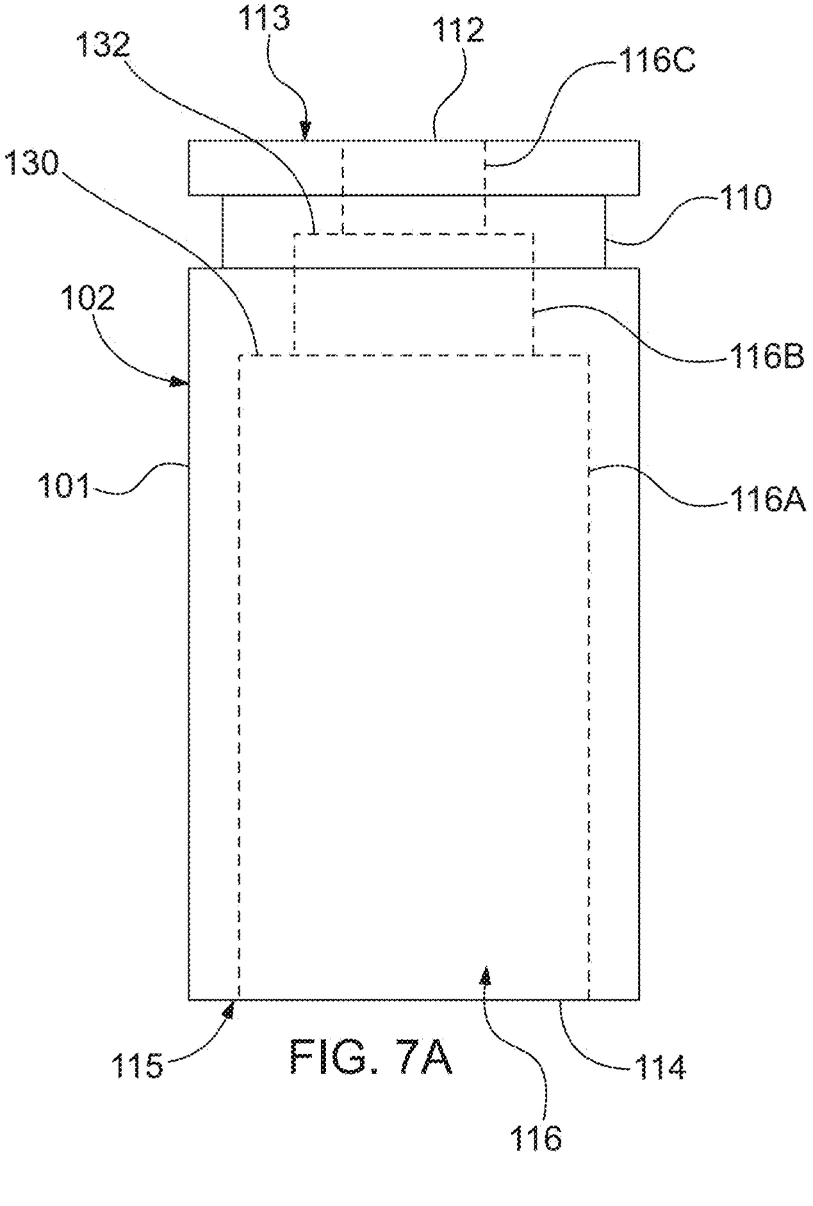
FIG. 7A shows a side view of a sleeve of the dampener assembly with internal structures shown in dotted lines.
Figure 7B:
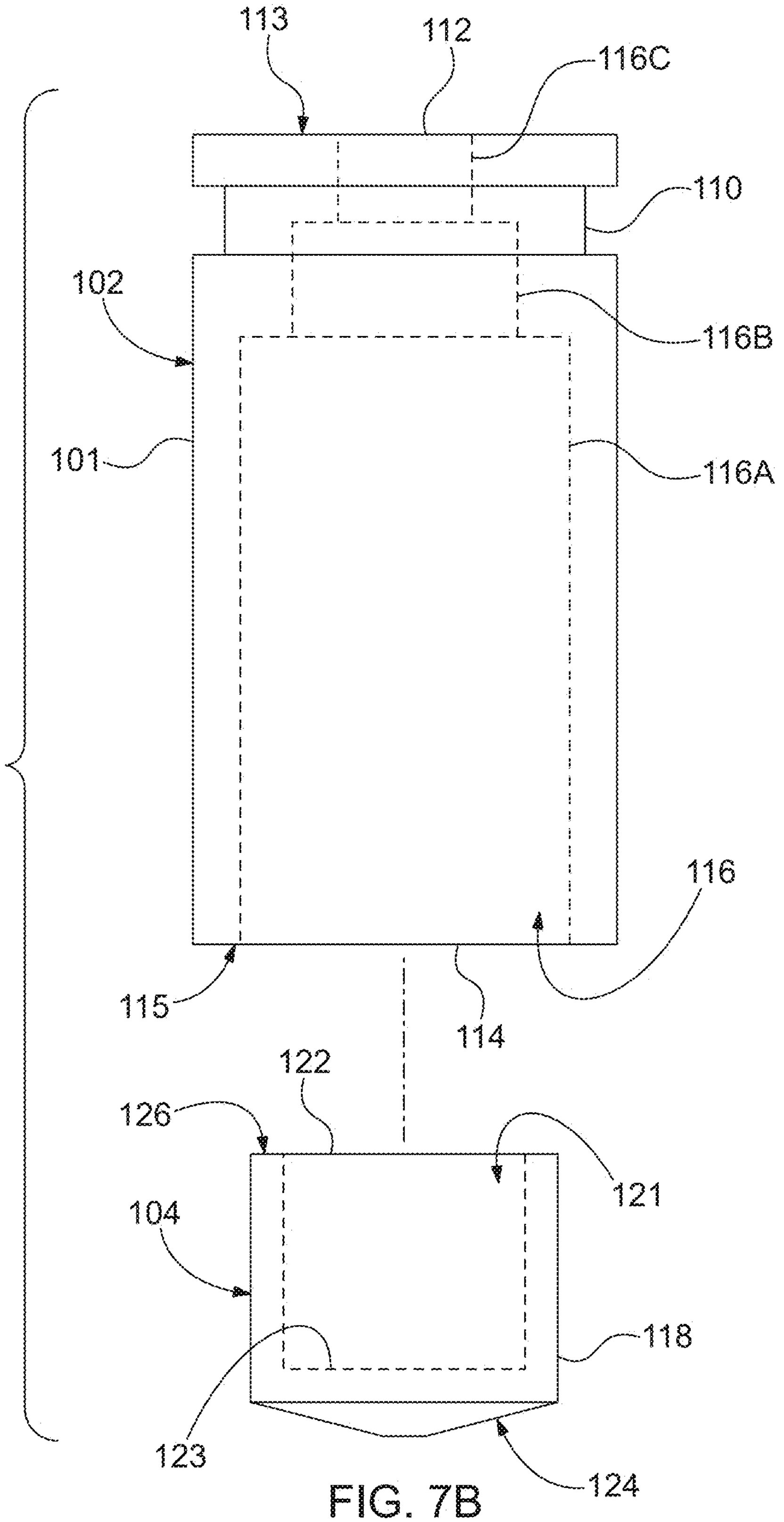
FIG. 7B shows a side view of the sleeve and a piston of the dampener assembly with internal structures shown in dotted lines.
Figure 7C:
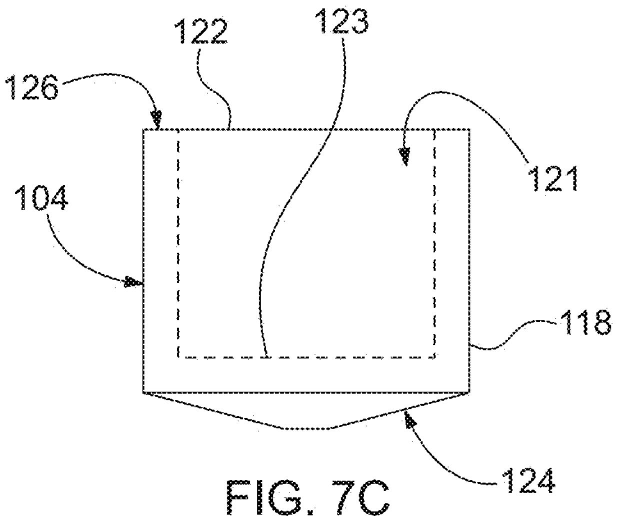
FIG. 7C shows a side view of the piston of the dampener assembly with internal structures shown in dotted lines.

FIGS. 7A-7C provide views of the piston 104 a sleeve 102 structures of the dampener assembly 100. The sleeve 102 has a cylindrical body 101 shaped to be inserted into pocket or bore B in the valve casting body VC. The body 101 has at least one circumferential groove 110 for accepting and securing the ring 108 to the sleeve 102. An inner chamber 116 longitudinally extends between opposing ends 113 and 115. Opening 112 at the end 113 is fluidly connected to the opening 114 at the end 115 via the cylindrical chamber 116.

The chamber has three distinct cylindrical portions 116A, 116B, and 116C. The portion 116A is configured to house at least a partial length of the piston 104 after it is slidingly inserted into the chamber 116. The portion 116A has an end wall 130 which sets a maximum length that the piston 104 move within the chamber 116, as shown in FIG. 9B. The portion 116B is narrower in diameter than portion 116A and is configured to secure the spring 106, both laterally via the small diameter and longitudinally via end wall 132. The end wall 132 provides a surface to hold the spring 106 and allow the spring to be compressed or expanded relative to an opposite wall 123 in the chamber 121 of the piston 104. The portion 116C is fluidly connected to opening 112 as a vent to allow fluid movement into and out of the chamber 116 and the sleeve 102 in response to pressure applied to the piston 104. The portions 116A, 116B, and 116C are all fluidly connected to each other.

The dampener sleeve 102 has preferred measurements. A total length of the sleeve 102, from end 113 to end 115, is 19.05 mm (0.750"). A diameter of the cylindrical body 101 is 9.9822 mm+/−0.00508 mm (0.393"+/−0.0002"). A preferred length of the groove 110 is 1.524 mm (0.060"). A preferred diameter of the groove 110 is 8.4328 mm+/−0.0254 mm (0.332"+/−0.001"). A total length of the chamber, from opening 112 to opening 114, is 19.05 mm (0.750"). A preferred length of portion 116A of the chamber 116 is 14.224 mm (0.560"). A preferred diameter of portion 116A of the chamber 116 is 7.366 mm (0.290"). A preferred length of portion 116B of the chamber 116 is 2.794 mm (0.110"). A preferred diameter of portion 116B of the chamber 116 is 5.1562 mm (0.203"). A preferred length of portion 116C of the chamber 116 is 2.032 mm (0.080"). A preferred diameter of portion 116C of the chamber 116 is 3.175 mm (0.125").

The piston 104 has a cylindrical body 118 with opposing ends 124 and 126. The end 126 has an opening 122 to an inner cylindrical chamber 121 inside the body 118. The opening 122 is fluidly connected to the chamber 121. The chamber 121 has wall or surface 123 that is oriented oppositely to the opening 122 and is configured to accept the end 106A of spring 106 or another spring embodiment. The end 124 may be shaped differently, as provided in FIGS. 8A-8E, depending on varying parameters and needs.

The dampener piston 104 has preferred measurements. A total length of the body 118 of piston 104 is preferably 8.89 mm (0.350"). A total diameter of the body 118 is 7.366 mm+/−0.00508 mm (0.290"+/−0.0002"). A length of the chamber 121 is preferably 6.096 mm (0.240"). A diameter of the chamber 121 is preferably 4.826 mm (0.190").

OEM dampeners $D_{OEM}$, including remanufactured OEM dampeners, are known to fail. They routinely break through the bottom of the piston $P_{OEM}$ from hydraulic stress. Hydraulic oscillation increases the fatiguing effect of applied pressure on the bottom surface of the piston $P_{OEM}$ until it fractures. The thin material can't withstand the forces.

Encapsulation provided by the sleeve 102 of the dampener assembly requires a smaller diameter piston 104 yet provides several favorable advantages. Reduced surface area lowers hydraulic stress on the part.

A dome- or arched-shaped end 124, or piston bottom, increases load bearing strength exponentially, making the piston 102 end 124 virtually unbreakable. Different piston 102 shapes are shown in FIGS. 8A-8E, and each may be preferable in different scenarios.

Figure 8A:
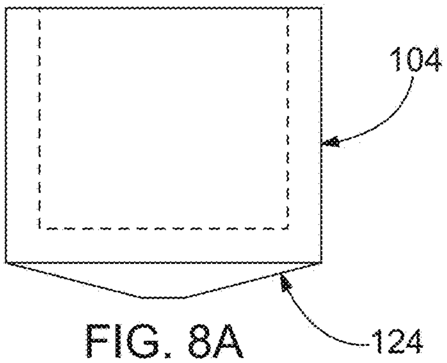
FIG. 8A shows a side view of a piston embodiment of the dampener assembly with internal structures shown in dotted lines.
Figure 8B:
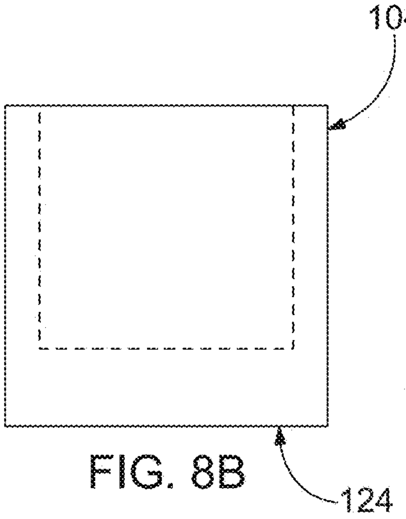
FIG. 8B shows a side view of an alternate piston embodiment of the dampener assembly with internal structures shown in dotted lines.

The end 124 of FIG. 8B, with an extra thick end, may be preferable if the bore B has an undercut relief at a bottom of the bore to collect debris. Otherwise, corner deformation could occur, even with a 0.1-0.5 mm corner break along a circumference of end 124.

Figure 8C:
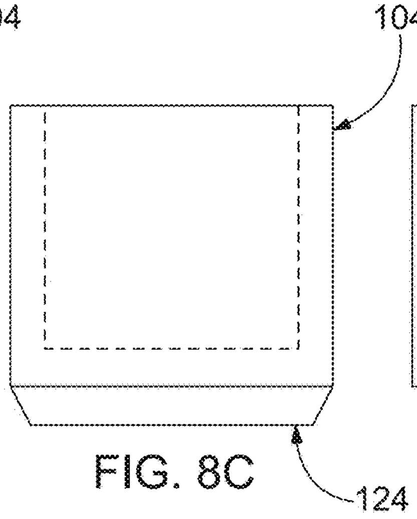
FIG. 8C shows a side view of an alternate piston embodiment of the dampener assembly with internal structures shown in dotted lines.

The end 124 of FIG. 8C is mechanically simple and avoids corner interference due to a build-up of debris in the bore B. This embodiment of the piston 104 is useful with uneven bore floor that allows adequate fluid distribution.

Figure 8D:
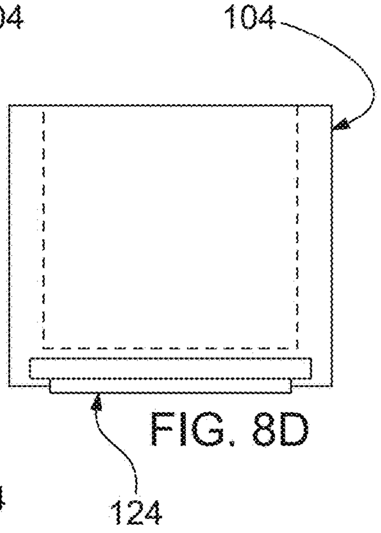
FIG. 8D shows a side view of an alternate piston embodiment of the dampener assembly with internal structures shown in dotted lines.

The end 124 of FIG. 8D is generally useful for a wide and flat bore B bottom with corner interference, and feeds through a large cavity in the center of the bore floor. The lower step of the end 124 is reducible to any diameter.

Figure 8E:
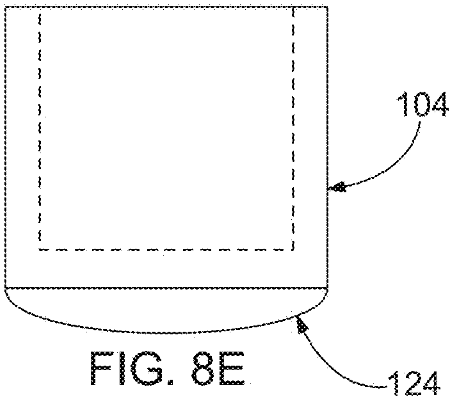
FIG. 8E shows a side view of an alternate piston embodiment of the dampener assembly with internal structures shown in dotted lines.

The end 124 of FIG. 8E is used when hydraulic feed is delivered at the bottom corner of the bore. This configuration allows more even distribution over the full surface until the piston 104 is lifted.

Figure 9A:
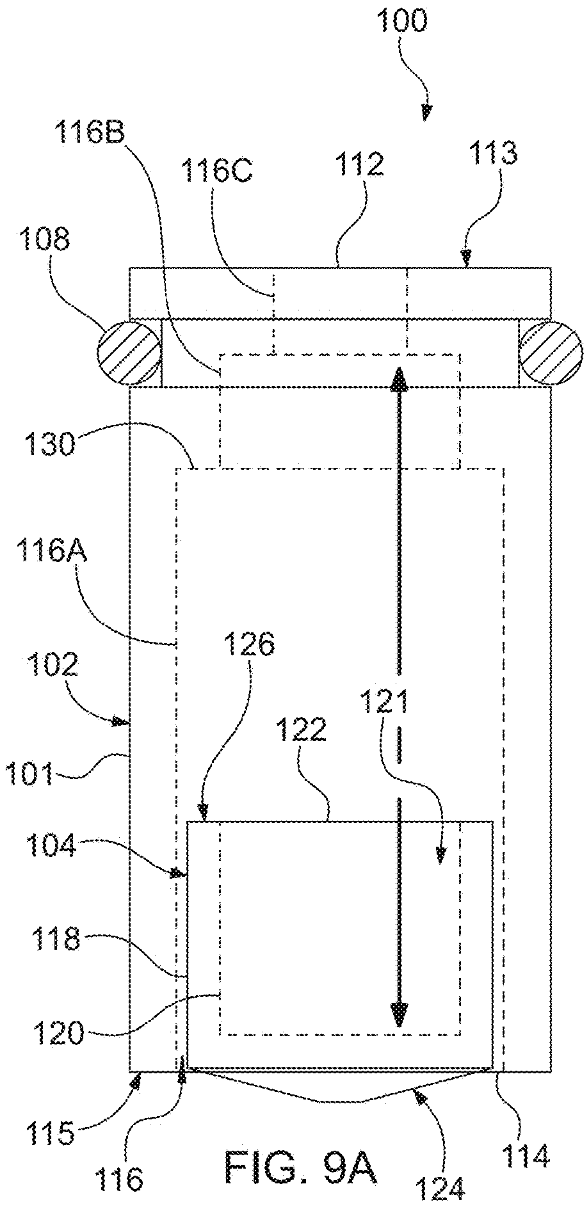
FIG. 9A shows a side view of the assembly dampener assembly with the piston engaged within the sleeve at a first position.
Figure 9B:
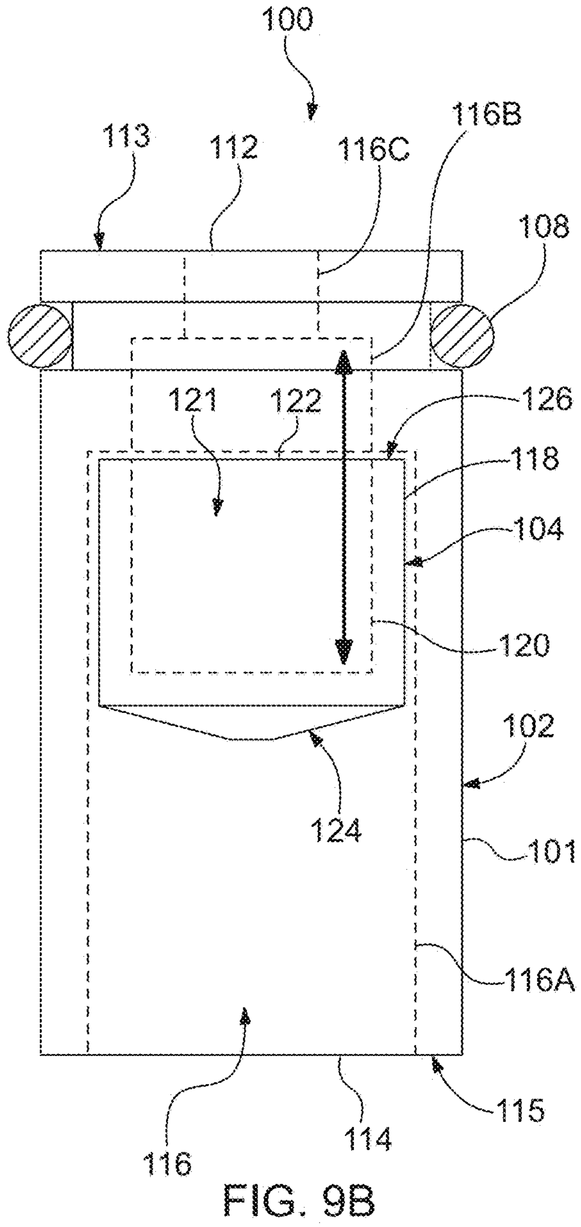
FIG. 9B shows a side view of the assembly dampener assembly with the piston engaged within the sleeve at a second position.

FIGS. 9A and 9B depict the piston 104 position in the chamber 116 of the sleeve 102 in relation to different pressure environments. In FIG. 9A, the piston 104 is in a low-pressure position as it would be once installed in the bore B of the valve body casting VC. The spring 106, not shown, would be fully relaxed or only slightly compressed. In FIG. 9B, the piston 104 is positioned relative to a high-pressure, with end 126 contacting surface 130 of the sleeve 102. In this configuration, the spring 106, not shown, would be highly or even fully compressed due to high pressure acting on the piston 104.

Figure 10:
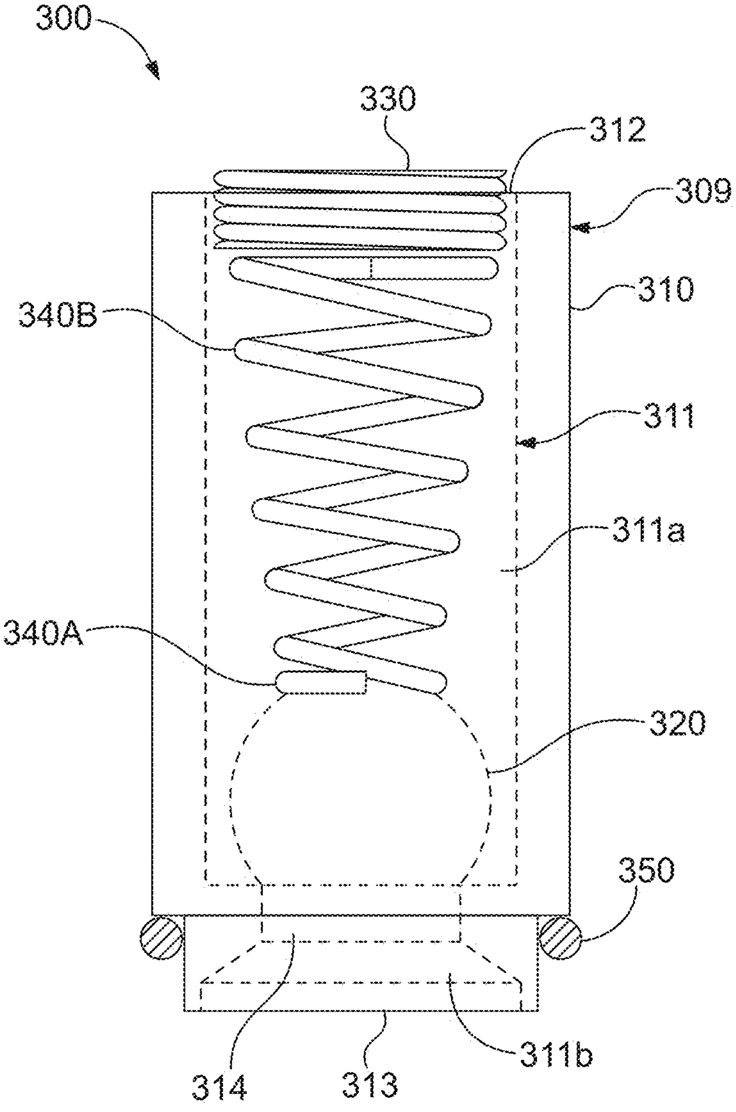
FIG. 10 shows a side view of an anti-ballooning dampener assembly according to an embodiment of the present invention, with dotted lines showing internal structures.
Figure 11:
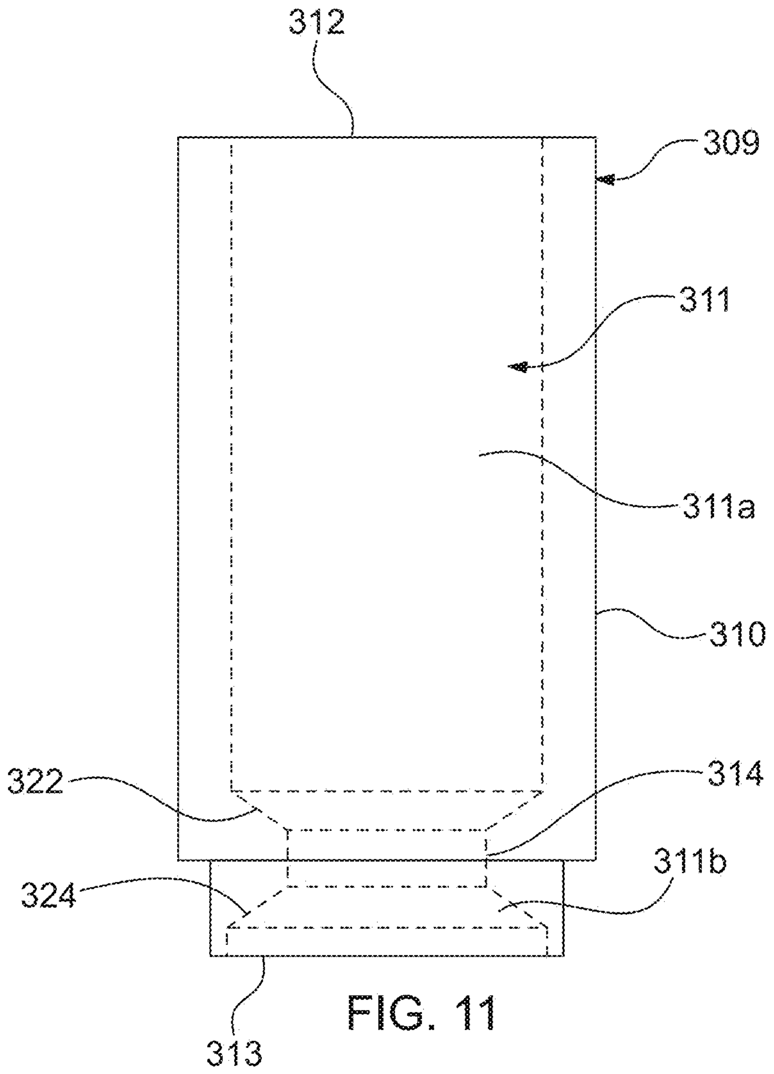
FIG. 11 shows a side view of a valve body of the anti-ballooning dampener assembly of FIG. 27.
Figure 12:
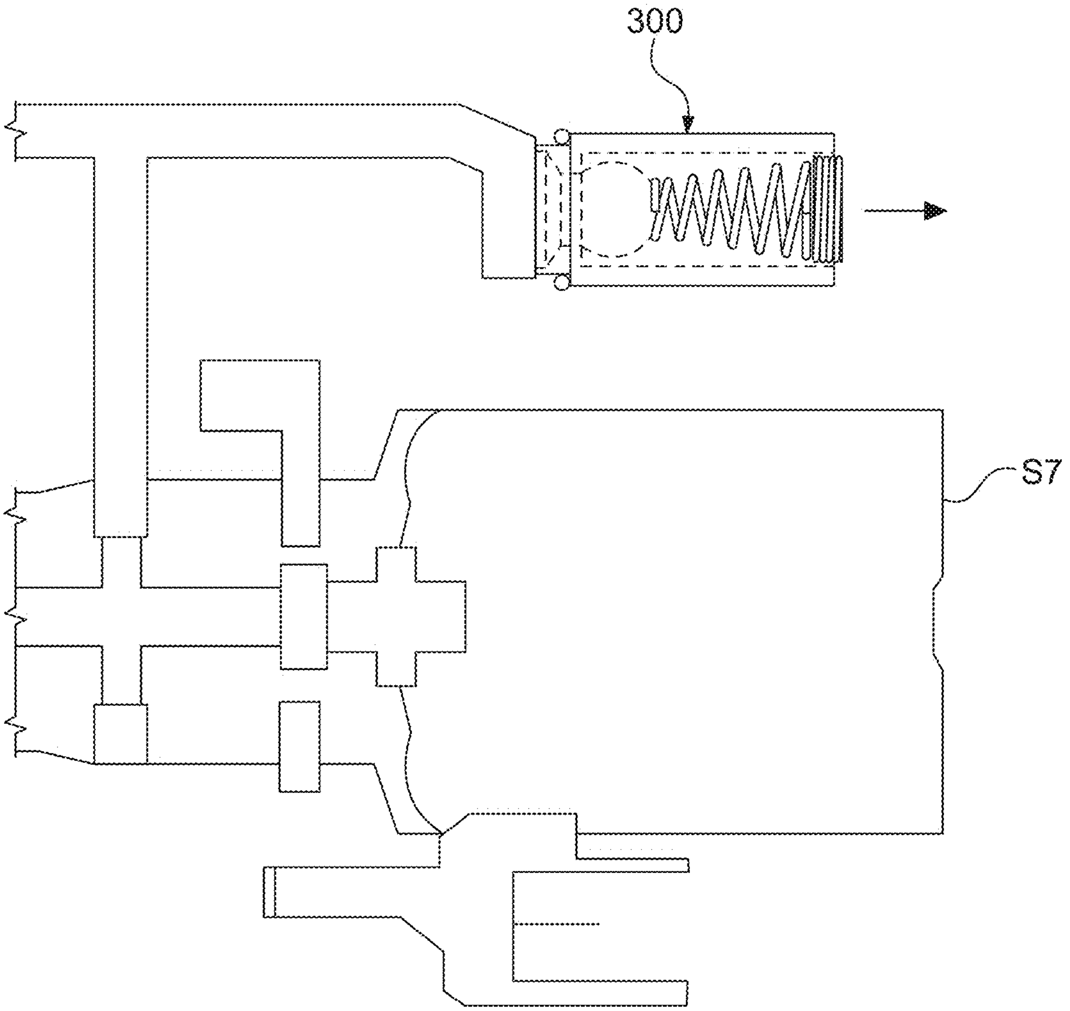
FIG. 12 shows a hydraulic diagram showing the anti-ballooning dampener assembly replacing the OEM oscillation dampener in the 8L(xx) series transmission.
Figure 13:
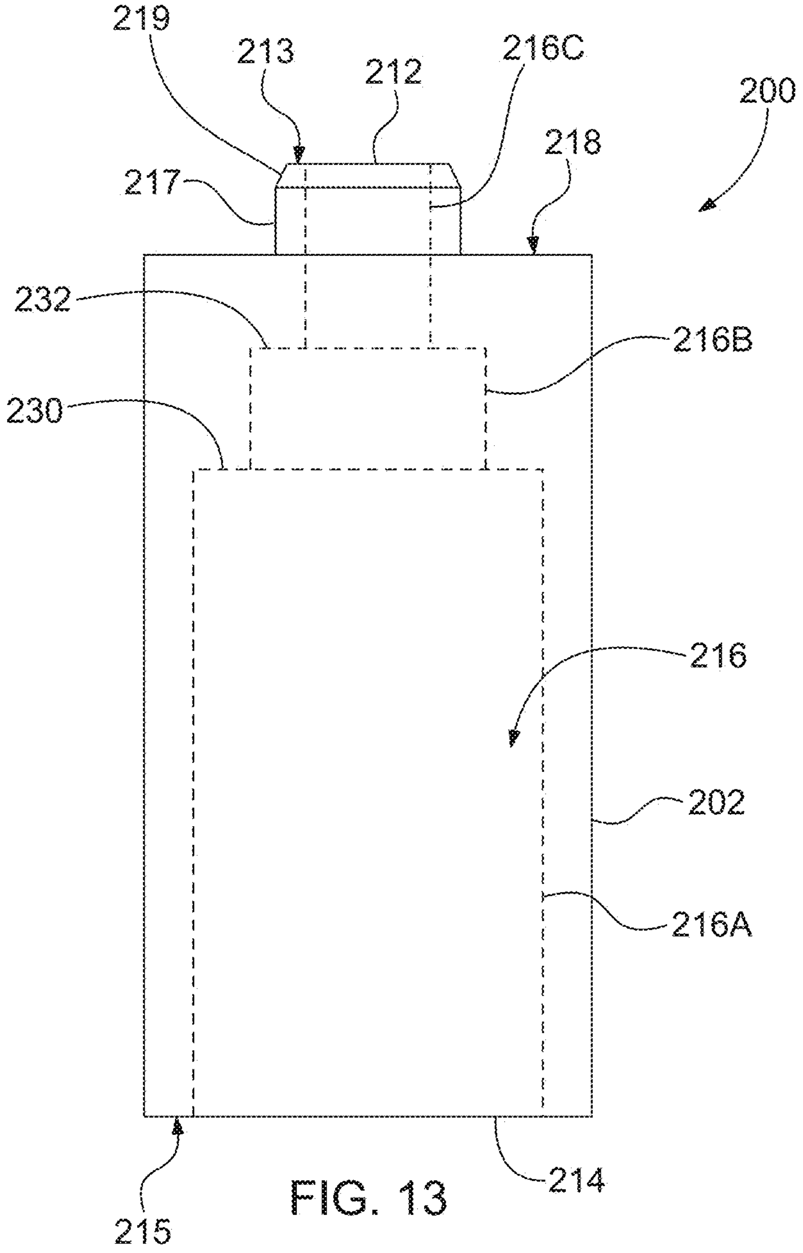
FIG. 13 shows a side view of an alternate sleeve embodiment of the dampener assembly with internal structures shown in dotted lines.

In the case of the 8L GM 8 speed rear wheel drive transmission, a regular rectangular compression spring 106 is used, as shown in FIG. 4. But if piston stroke was very limited, alternate shapes are available, like a cone spring, since it can compress nearly flat, i.e. to 1-2 coil height. Such a cone spring is shown in the dampener embodiment of FIG. 10 as spring 340. The spring 340 has a narrow spring end 340A and wide spring end 340B. Again, shape is determined by engineering constraints. Special shapes or a special electrically neutral material, i.e. non-conductive and/or non-magnetic, may be required under special circumstances. In this case, since a spring is an integral part of a functioning assembly, it must be considered as a necessary and included component of the whole, but the emphasis is its function and inclusion in that assembly. However, the spring 106 may differ based on preferred tension regarding movement of the piston 104 in the sleeve 102 at desired pressure levels during transmission operation. Chrome silicon, chrome vanadium, and 17-7 stainless steel are preferred wire material for springs 106.

With reduced piston 104 size, the required spring load, i.e. deflected tension, is reduced. It must be recalibrated to match smaller piston area, if the operational pressure range of the dampener is to be maintained. Reduced area allows use of a lower rate spring 106 and combined with a piston 104 that travels a greater distance to absorb the same volume, this allows the piston to take greater advantage of the spring function. Spring tension is more gradually increased during piston travel. Put differently, dampener efficiency is increased, absorbing more of the oscillation. This is because fluid oscillation is a pressure pulse that does not displace a large volume of fluid, so more of the pulse wave can be absorbed by the dampener.

An alternate embodiment of the dampener assembly utilizes a no-seal sleeve 200 instead of sleeve 102. The piston 104 and spring 106 of the previously discussed embodiments are all usable and applicable with the sleeve 200. The sleeve 200 has a cylindrical body 202 shaped to be inserted into pocket or bore B in the valve casting body VC. Unlike sleeve 102 and its cylindrical body 101, the cylindrical body 202 of sleeve 200 does not have any circumferential groove for accepting and securing the elastomeric ring 108. The ring 108 is not used with sleeve 200 in a dampener assembly embodiment 100 that utilizes the sleeve 200.

The cylindrical sleeve 200 has an inner chamber 216 that longitudinally extends between opposing ends 213 and 215 of the sleeve 200. Opening 212 at the end 213 is fluidly connected to the opening 214 at the end 215 via the cylindrical chamber 216. The cylindrical body 202 has opposing ends being the end 215 and end 218. A cylindrical member 217 extends from the end 218 of body 202 to end 213 of the overall sleeve 200. The end 213 of the member 217 may have a bevel 219 extending around a circumference of the member 217. The opening 212 is located along end 213 of the cylindrical member 217.

The chamber 216 has three distinct cylindrical portions 216A, 216B, and 216C of varying diameters. The portion 216A is configured to house at least a partial length of the piston 104 after it is slidingly inserted into the chamber 216. The portion 216A has an end wall 230 which sets a maximum length that the piston 104 move within the chamber 216. The portion 216B is narrower in diameter than portion 216A and is configured to secure the spring 106, both laterally via the small diameter and longitudinally via end wall 232. The end wall 232 provides a surface to hold the spring 106 and allow the spring to be compressed or expanded relative to an opposite surface 123 in the chamber 121 of the piston 104. The portion 216C is fluidly connected to opening 212 as a vent to allow fluid movement into and out of the chamber 216 and the sleeve 200 in response to pressure applied to the piston 104. The portions 216A, 216B, and 216C are all fluidly connected to each other.

The dampener sleeve 200 has preferred measurements. A total length of the sleeve 200, from end 213 to end 215, is preferably 21.082 mm (0.830"). A length of the body 202, from end 218 to end 215, is 19.05 mm (0.750"). A diameter of the cylindrical body 101 is 9.9822 mm+/−0.00508 mm (0.393"+/−0.0002"). A total length of the chamber 216, from opening 212 to opening 214, is 21.082 mm (0.830"). A preferred length of portion 216A of the chamber 216 is 14.224 mm (0.560"). A preferred diameter of portion 216A of the chamber 116 is 7.366 mm (0.290"). A preferred length of portion 216B of the chamber 216 is 2.794 mm (0.110"). A preferred diameter of portion 216B of the chamber 216 is 5.1562 mm (0.203"). A preferred length of portion 216C of the chamber 216 is 4.064 mm (0.160"). A preferred diameter of portion 216C of the chamber 216 is 2.6162 mm (0.103"). The member 217 preferably has a total length of 2.032 mm (0.080") and a diameter of 3.9624-3.9878 mm (0.156-0.157") and a corner break along bevel 219 of 0.508 mm (0.020"). Unless otherwise noted, the tolerance of the measurements described in relation to the sleeve 200 is +/−0.0762 mm (+/−0.003").

To install a dampener assembly utilizing the sleeve 200, the member 217 is inserted through a dampener vent hole in a spacer plate after the OEM dampener has been removed. The diameter of the body 202 is matched as close as possible with the bore B to effectively prevent fluid leakage between the sleeve 200 and the bore.

To begin installation of the dampener assembly of the present invention, the OEM dampener $D_{OEM}$ is first removed from the pocket B on the valve body casting VC. The pocket B may optionally be cleaned and any debris removed after removal of the OEM dampener $D_{OEM}$. The diameter of the pocket bore B is next measured to determine the size ring 108 to be installed on the sleeve 102 of the dampener assembly 100. Next, the appropriate ring 108 is installed on the sleeve 102. The new dampener assembly 100 is then installed in the pocket bore B. This can be achieved by installing the piston 104 and spring 106 inside the sleeve 102 first, then installing sleeve, spring, and piston together in the bore, or each part of the dampener assembly can be installed piece by piece in the bore. The piston 104 would be installed in the bore B first. The spring 106 would be installed next or could be installed simultaneously with the piston. The sleeve, with appropriate ring 108, would be installed last.

As sleeve 200 does not utilize a seal or elastomeric ring 108 between the bore B and sleeve, the diameter of the sleeve 200 should be slightly smaller than the diameter of the bore to ensure fluid-tightness between the dampener assembly 100 and bore. Further, a differently sized sleeve 200 may be used in reamed bores versus un-reamed bores.

The cylindrical member 217 of the sleeve 200 embodiment may be incorporated with the sleeve embodiment 102 utilizing a ring 108 and groove 110.

The anti-ballooning dampener assembly 300 includes a sleeve 309 having a cylindrical body 310 with a chamber 311 extending through an interior of the cylindrical body, ends of the chamber defined by two opposing openings 312 and 313. Each opening 312 and 313 is located at an opposing longitudinal end of the cylindrical body 310. The chamber 311 has a choke area 314 that has a smaller diameter than a remainder of the chamber on either side of the choke area. A valve member 320 is sized to partially fit within the choke area 314, specifically within an upper chamber 311A, to fluidly seal the upper chamber 311A from the lower chamber 311B via the choke 314. The valve member may be spherical, as shown in FIG. 27, or be conical, have a conical portion, or be any other shape that would provide a fluid seal at choke 314. A sloped circumference 322 of the upper chamber 311A allows a metered transition in diameter between the upper chamber to the choke area 314. A lower chamber 311B of the chamber 311 on the other side of the choke area 314 opposite to the upper chamber 311A also has a sloped circumference 324 to again allow for a metered transition in diameter between the lower chamber to the choke area. A conical spring 340 with a first end 340A and a second end 340B, the first end having a smaller diameter than the second end. A circular spring seat 330 is provided to fit at least partially within the upper chamber 311A. The spring set 330 is configured to allow liquid to pass through it along opening 312 and into chamber 311 and vice versa. The valve member 320 is configured to sit within the choke area 314 and the conical spring 340 is configured to be positioned between the ball and circular spring seat 330 when the anti-ballooning dampener assembly 300 is assembled. The cylindrical body 310 has a narrowed portion 326 through which a portion of the choke 314 and the lower chamber 311B extend. The narrowed portion 326 also has opening 313 being a free end of the sleeve 309. A seal, being an O-ring 350, is securable around a circumference of the narrowed portion 326 and preferable against the cylindrical body 310.

A preferred embodiment of the anti-ballooning dampener assembly 300 has specific dimensions. The sleeve 309 preferably has a total length of 19.558 mm (0.770"). The cylindrical body 310 preferably has a length of 17.018 mm (0.670") and a diameter of 9.9822 mm+/−0.00508 mm (0.393"+/−0.0002"). The narrowed portion has a length of 2.54 mm (0.100") and a diameter of 8.4328 mm+/−0.0254 mm (0.332"+/−0.001"). The chamber 311 has a diameter of 7.366 mm (0.290") and a length, from opening 312 to the choke 314, of 16.51 mm (0.650"). The choke 314 has a diameter of 3.9624 mm (0.156"). The opening 313 has a diameter of 6.75132 mm (0.2658"). The valve member 320 shown in FIG. 27 preferably has a diameter of 5.95376 mm (0.2344").

To install the anti-ballooning dampener assembly 300, an OEM spring-loaded piston of the OEM pressure oscillation dampener D is removed. The anti-ballooning dampener assembly 300 is then inserted into the same orifice from where the OEM spring-loaded piston was removed. The sleeve 309 of the anti-ballooning dampener assembly 300 is inserted opening 313 first. The valve member 320, spring 340, and spring seat 330 may be installed in the sleeve 309 before insertion of the sleeve or afterwards. If afterwards, the valve member 326 is inserted first, then the spring 340 with narrower end 340A installed first to contact the valve member 320. The spring seat 330 is then installed in contact with wider end 340B of the spring 340. The spring 340 is configured to compress and expand in response to increasing or decreasing, respectively, pressure applied to valve member 320 via fluid flow through choke 314. The spring seat 330 may be separate from the spring 340 or may be formed into a single or connected piece with the spring.

A further embodiment of providing anti-ballooning oscillation dampeners may include removing multiple dampeners $D_{OEM}$ from pockets B, including $B_{100}$ and $B_{300}$ identified in FIG. 1. Then, a dampener assembly 100 is installed, as described herein, in each pocket $B_{100}$. Further, an anti-ballooning dampener assembly 300 is installed, as described herein, in pocket $B_{300}$. Additionally, spheres or balls 150, preferably made of polyamide-imide and having a diameter of 6.35 mm (0.250"), may be installed in the valve body casting at the locations shown in FIG. 1.

I claim:

1. A dampener assembly configured to be inserted into a dampener bore, comprising:

a sleeve, a piston, and a spring, the spring positioned within and between both the piston and the sleeve, the sleeve including a cylindrical body having a first opening at a first end and a second opening along a second end, the second end and the second opening being oppositely oriented along a longitudinal length of the sleeve relative to the first end and the first opening, wherein an inner chamber extends within the sleeve between the first opening and the second opening, and the inner chamber includes a first portion having a diameter to receive the piston, a second portion having a diameter to receive the spring and being smaller than the diameter of the first portion, and a third portion having a diameter smaller than the diameter of the first portion and the diameter of the second portion and being fluidly connected to the second opening, wherein the spring is secured at one end within the piston against an inner wall of a cavity of the piston and at an opposite end against an end wall of the second portion of the inner chamber of the sleeve.

2. The dampener assembly of claim 1, further comprising an elastomeric ring configured to be installed in a groove along an outer surface of the sleeve.

3. The dampener assembly of claim 2, wherein the elastomeric ring is installed in the groove such that a fluid-tight seal is formed between the elastomeric ring and the dampener bore of a valve body when the dampener assembly is installed within the dampener bore.

4. The dampener assembly of claim 1, wherein the cylindrical body is configured to be fluid-tight to the dampener bore.

5. The dampener assembly of claim 1, wherein there is no seal positioned between the sleeve and dampener bore.

6. The dampener assembly of claim 1, wherein the first opening along the first end is configured to allow insertion of the piston into the inner chamber of the sleeve.

7. The dampener assembly of claim 1, wherein the piston has a rounded dome shape along a bottom surface.

8. The dampener assembly of claim 1, wherein the piston has a stepped shape along a bottom surface.

9. A method of repairing transmission dampeners with reamed or un-reamed bores, comprising:

removing an OEM dampener assembly from a dampener bore of a valve body; and installing a dampener assembly according to claim 1 in the dampener bore such that the cylindrical member of the sleeve is inserted through a dampener vent hole in a spacer plate.

10. A dampener assembly configured to be inserted into a dampener bore, comprising:

a sleeve, a piston, and a spring, the spring positioned within and between both the piston and the sleeve, the sleeve including a cylindrical body having an opening at a first end and a second opening along a cylindrical member longitudinally extending from a second end of the sleeve, both the second end and the cylindrical member being oppositely oriented to the first end along a longitudinal length of the sleeve, and wherein an inner chamber extends within the sleeve and along the cylindrical member between the first opening and the second opening, and the inner chamber includes a first portion having a diameter to receive the piston, a second portion having a diameter to receive the spring and being smaller than the diameter of the first portion, and a third portion having a diameter smaller than the diameter of the first portion or the diameter of the second portion and being fluidly connected to the second opening, wherein the spring is secured at one end within the piston against an inner wall of a cavity of the piston and at an opposite end against an end wall of the second portion of the inner chamber of the sleeve.

11. The dampener assembly of claim 10, wherein the cylindrical body is configured to be fluid-tight to the dampener bore.

12. The dampener assembly of claim 10, wherein there is no seal positioned between the sleeve and dampener bore.

13. The dampener assembly of claim 10, wherein the sleeve does not have a groove along an outer surface of the sleeve.

* * * * *